July 19, 1927.

A. S. FISHEL

BRAKE SUPPORTING AND OPERATING MECHANISM

Filed Dec. 5, 1923

INVENTOR
Alois S. Fishel
BY Hull, Buck & West,
ATTYS.

July 19, 1927.

A. S. FISHEL 1,636,221

BRAKE SUPPORTING AND OPERATING MECHANISM

Filed Dec. 5, 1923

6 Sheets-Sheet 2

INVENTOR
Alvin S. Fishel,
By Hull, Brock & West
ATTYS.

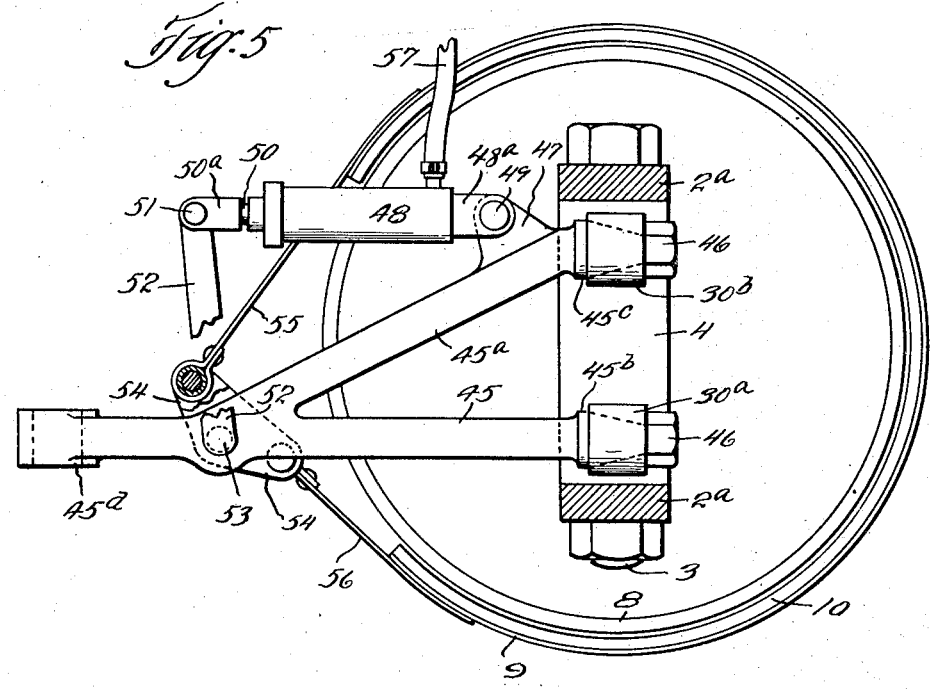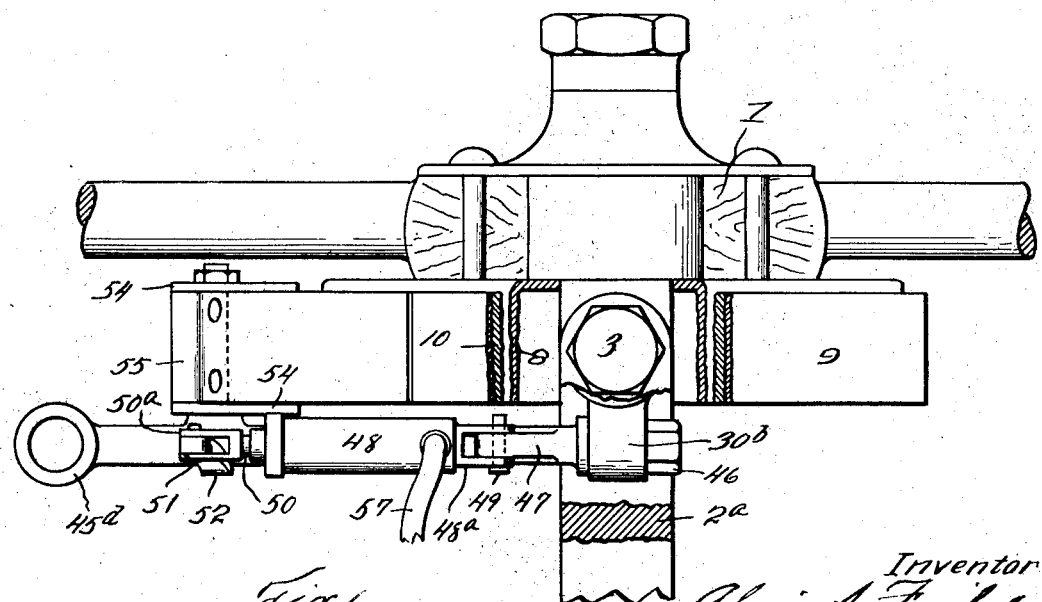

July 19, 1927.  
A. S. FISHEL  
1,636,221  
BRAKE SUPPORTING AND OPERATING MECHANISM  
Filed Dec. 5, 1923   6 Sheets-Sheet 4
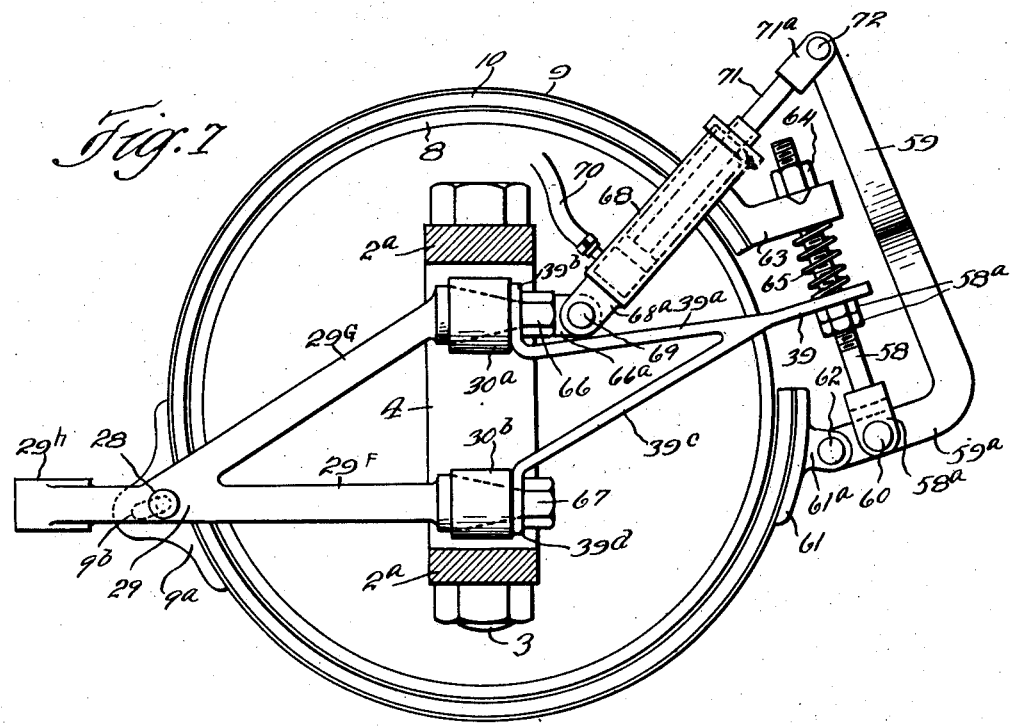
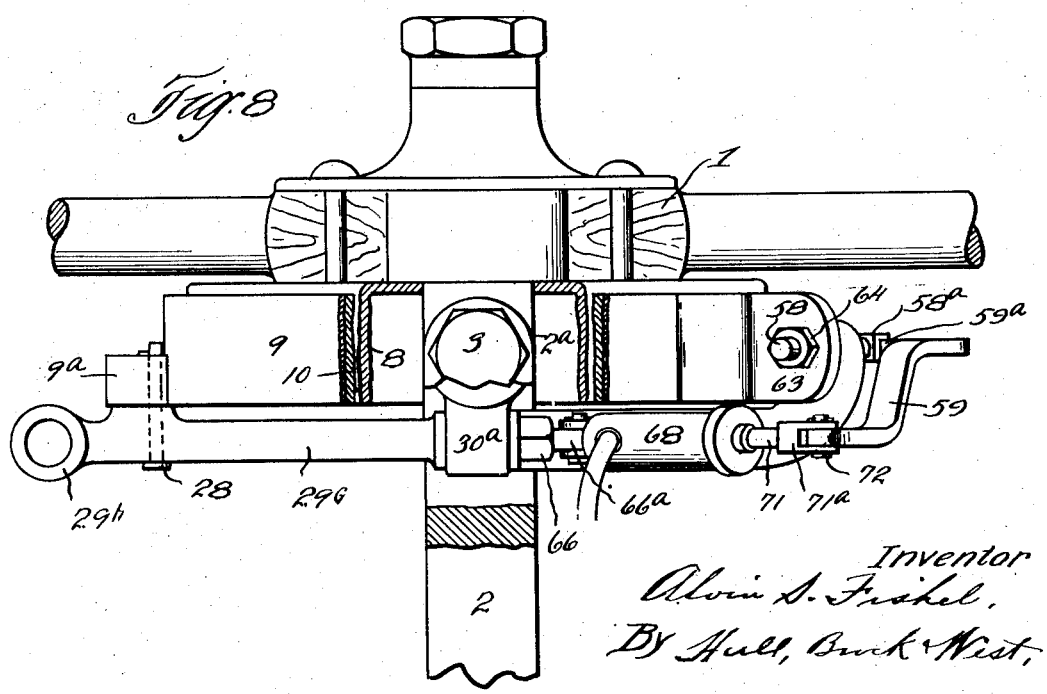
Inventor
Alvin S. Fishel.
By Hull, Brock & West,
Attys.

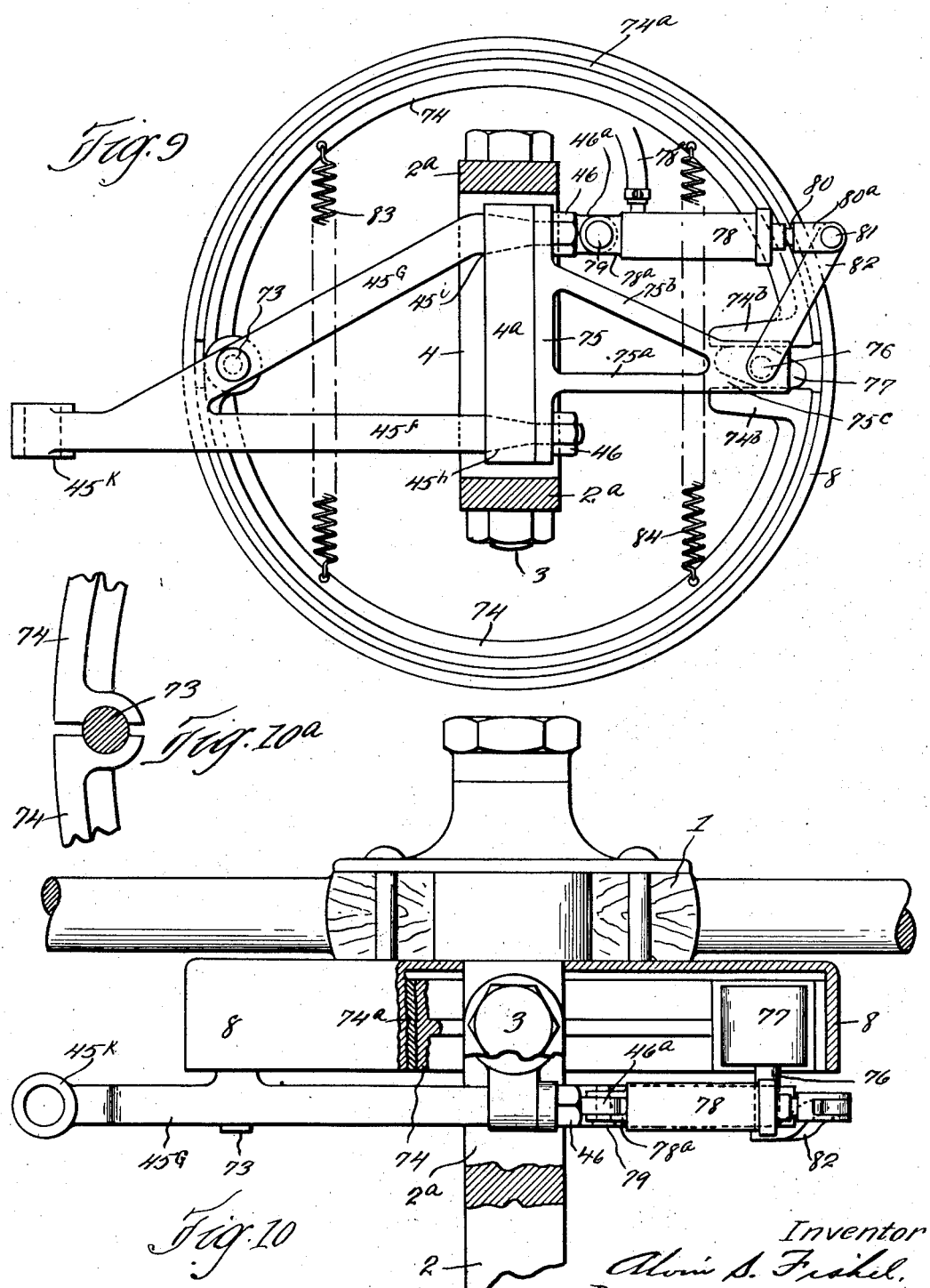

Patented July 19, 1927.

1,636,221

UNITED STATES PATENT OFFICE.

ALVIN S. FISHEL, OF CLEVELAND, OHIO.

BRAKE SUPPORTING AND OPERATING MECHANISM.

Application filed December 5, 1923. Serial No. 678,665.

This invention relates to brakes for automobiles, or similar vehicles, and more especially to brakes arranged to be operated by fluid pressure, the embodiment shown herein being designed preferably for the use of oil or similar liquid as the actuating fluid.

It is the general purpose and object of the invention to provide a particularly efficient manner of mounting the brake-operating cylinders and of supporting and operating the brakes. Further and more limited objects of the invention will appear in the specification and will be realized in and through the combinations of elements embodied in the claims.

Figure 1:
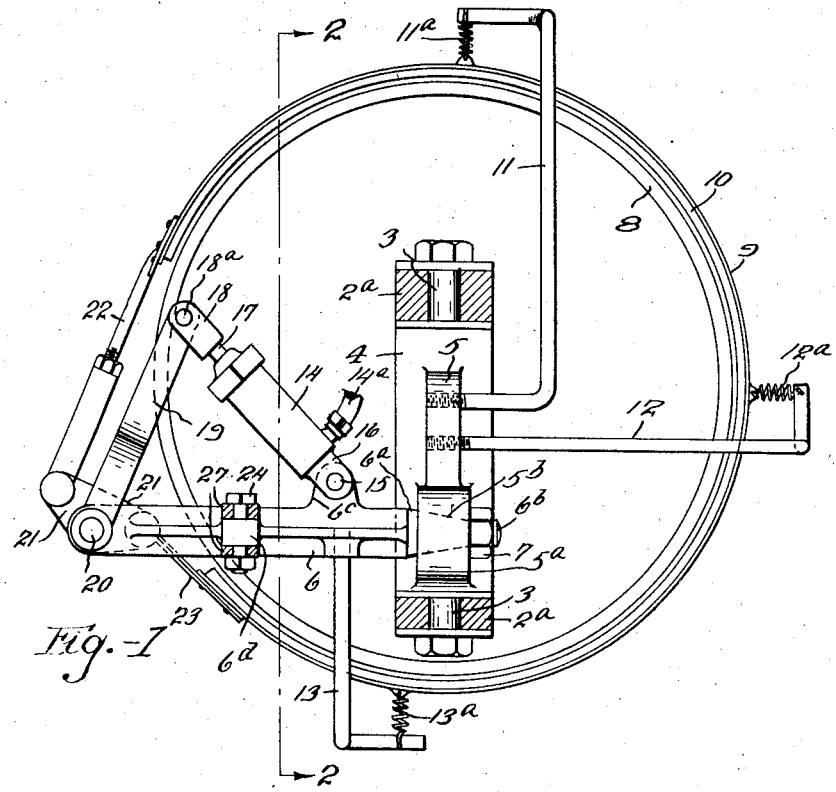
Figure 2:
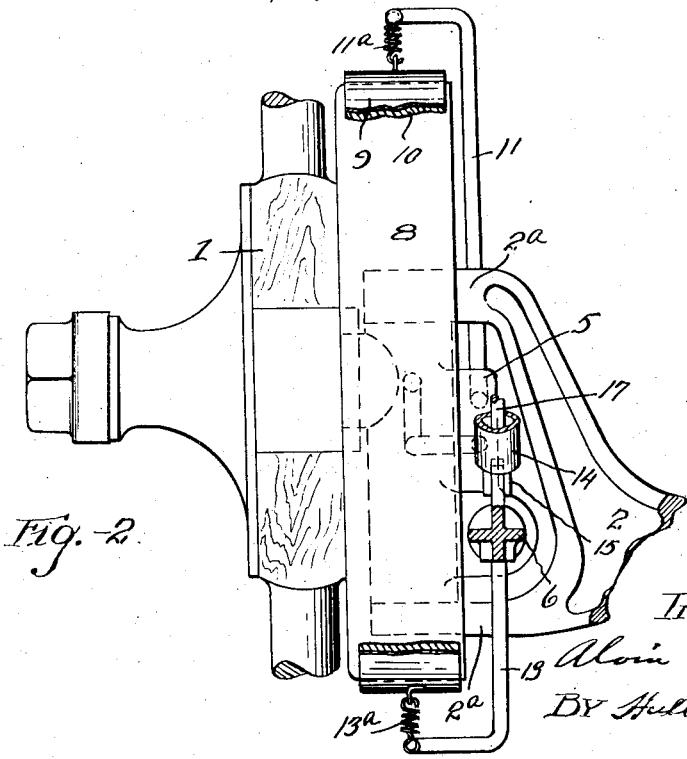
Figure 3:
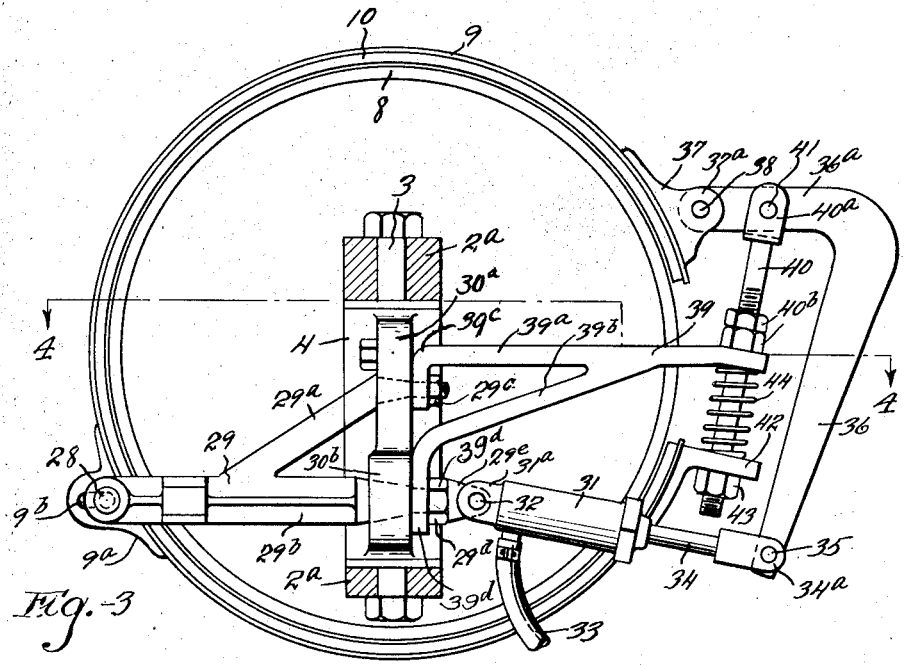
Figure 4:
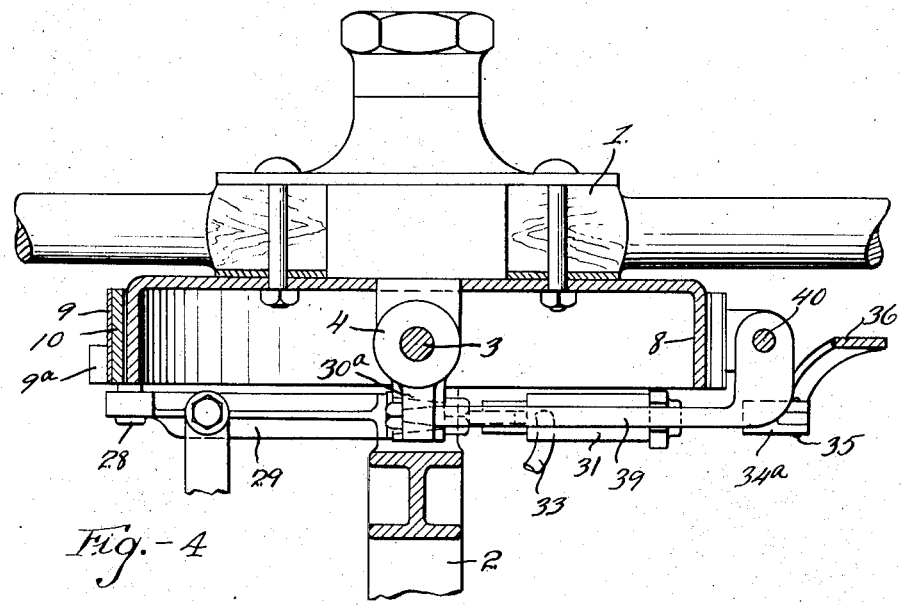

In the drawings forming part hereof, Fig. 1 represents a sectional side elevation of a brake drum as applied to the front, or steering wheel, of an automobile, together with the brake and associated parts for supporting and operating the same; Fig. 2 is a sectional elevation corresponding approximately to the line 2—2 of Fig. 1 and showing the brake drum in elevation and the wheel hub in section; Fig. 3 a view, similar to Fig. 1, showing a modified form of my invention; Fig. 4 a sectional view corresponding substantially to the line 4—4 of Fig. 3; Fig. 5 a view, similar to Figs. 1 and 3, of a still further modified form of my invention; Fig. 6 a plan view of the parts shown in Fig. 5, with certain parts broken away and the wheel hub shown in section; Figs. 7 and 8 are views, corresponding respectively to Figs. 5 and 6, of a still further modified form of the invention; Figs. 9 and 10 are views, also similar to Figs. 5 and 6, respectively, showing a further modification of the invention; Fig. 10$^a$ is a detail of the brake shoe mounting; and Figs. 11 and 12 views, also similar to Figs. 5 and 6, respectively, showing a still further modification of my invention.

Describing the parts by reference characters, and with particular reference to Figs. 1 and 2, 1 denotes generally the front, or steering wheel of an automobile or similar vehicle. 2 denotes the front axle, having the forks 2$^a$ adapted to receive the king pin 3, by means of which the said axle is pivoted to the steering knuckle 4, the said knuckle being shown in elevation in Fig. 1. The steering knuckle is provided with a pair of bosses 5, 5$^a$, the latter boss having a tapered aperture 5$^b$ therethrough adapted to receive the tapered end portion 6$^a$ of a steering arm 6. The tapered end portion 6$^a$ is provided with a threaded end 6$^b$, to which a nut 7 is applied and by means of which the arm is secured firmly to its seat in the lug. Surrounding the steering knuckle and the forked ends of the front axle is a brake drum 8, secured to the wheel 1. Nearly surrounding the brake drum is the brake band 9 having the lining 10. Under ordinary conditions, the brake band is held out of operative relation to the drum by means of the rods 11, 12 and 13, the two first-mentioned rods being threaded into the boss 5 and having their ends connected, by springs 11$^a$ and 12$^a$, respectively, to the top and the side of the band. The rod 13 is carried by the steering arm 6 and is connected to the lower part of the brake band by means of the spring 13$^a$. The rods and springs serve to hold the brake band out of operative relation to the drum except at such times as the band will be operated, by the mechanism now to be described.

14 denotes a cylinder having a clevis 16 at the lower end thereof by means of which it is pivotally connected to a lug 6$^c$ on the steering arm, the connection being effected by a pin 15. The piston rod 17 is connected by a clevis 18 and a pin 18$^a$ with the upper end of an arm 19, the lower end whereof is rigidly connected with a rock shaft 20 pivotally supported at the outer end of the arm 6. Oil or similar liquid for operating the piston is supplied to the cylinder by means of a pipe or hose 14$^a$. 21 denotes a pair of arms rigid with the shaft 20 and extending in opposite directions therefrom. One of these arms is connected by the adjusting stud 22 with the upper end of the brake band 9 and the other arm is connected by one or more metal straps 23 with the opposite end of the brake band. The steering arm is provided with a projection having an eye 6$^d$ for the reception of a bolt 24 by means of which and the clevis 27 on the end of the tie rod (not shown) the latter is secured to the said arm.

In the operation of the apparatus shown in the preceding views, when fluid under pressure is admitted to the lower end of the cylinder 14 through the pipe or hose 14$^a$, the piston is forced upwardly, rocking the arm 19 in the appropriate direction and causing the arms 21 to pull downwardly upon the upper end of the brake band and upwardly upon the lower end of the brake band, thus causing the brake band to engage the drum. By relieving the pressure of the fluid against the piston, the parts will be restored to the positions shown in Fig. 1, the springs 11$^a$, 12$^a$ and 13$^a$ facilitating this action.

By virtue of the construction shown and described herein, I am enabled to make use of the steering arm for the purpose of supporting the cylinder 14. I am also enabled to operate brakes in an efficient manner, with only slight and inexpensive changes in the construction of the steering knuckle and steering arm, and with but small change in the equipment used with ordinary brakes.

In the modification of my invention shown in Figs. 3 and 4, 2 denotes the front or steering wheel axle, 2$^a$ the forks thereof, 3 the king pin, 4 the steering knuckle, 8 the brake drum, 9 the brake, and 10 the brake lining, the parts being designated by the same numerals as are applied to corresponing parts in Figs. 1 and 2. The brake band is provided with an anchor bracket 9$^a$ having a slot 9$^b$ therein by means of which and a pin 28 the brake band is slidably supported on the steering arm 29. This arm is forked, as indicated at 29$^a$, 29$^b$, and each fork is provided with a tapered end fitting in a tapered seat provided respectively in lugs 30$^a$ and 30$^b$ on the steering knuckle, the tapered ends of the forks being drawn firmly to their seats by means of nuts 29$^c$ and 29$^d$.

The nut 29$^d$ is provided with a lug 29$^e$ to which the clevis 31$^a$ of a cylinder 31 is pivotally connected by the pin 32. The cylinder is provided with a supply pipe or hose 33, and the piston rod 34 is connected by a clevis 34$^a$ and a pin 35 with the lower end of the arm 36 of the angular brake band lever, the other arm of said lever being pivotally connected between the lugs 37$^a$ of a bracket 37 on the upper end of the brake band, by means of a pin 38.

39 denotes the outer portion of a brakeband supporting arm through which extends the adjusting stud 40 which is pivoted to the arm 36$^a$ of the angle lever by means of a clevis 40$^a$ and a pin 41, being provided above such arm with adjusting nuts 40$^b$. The lower end of the stud passes through the bracket 42 on the lower end of the brake band and is provided with the usual adjusting nut 43. Between such bracket and the arm 40 there is interposed a helical spring 44. The inner portion of the arm 39 is forked, as shown at 39$^a$ and 39$^b$, and the extreme inner ends of these forks are bent downwardly as shown at 39$^c$ and 39$^d$, and provided each with an aperture for the reception of the threaded ends of the fork 29$^a$ and 29$^b$, the parts 39$^c$ and 39$^d$ serving as washers between the nuts 29$^c$ and 29$^d$.

In operating the mechanism shown in Figs. 3 and 4, oil or other fluid under pressure is admitted through the pipe 33 to the lower end of the cylinder and forces the piston and the rod 34 outwardly, rocking the brake band lever about the pivot 38, thereby drawing upwardly on the stud 40 and applying the lower portion of the brake to the drum. When the lower portion of the brake is thus engaged, further movement of the piston and rod will rock the lever arm about the pin 41, forcing the upper portion of the brake band downwardly and into engagement with the drum. By applying still more pressure to the cylinder 31, the friction between the brake band and the drum will be correspondingly increased.

It will be noted that the brake-band mechanism shown in Figs. 3 and 4 is substantially identical with the present standard type of such mechanism, the brake band lever being reversed as compared with the position which it ordinarily occupies. The diagonal arm 29$^a$ serves as a brace or bolster to increase the rigidity of the steering arm; and the provision of two points of attachment between the steering arm and the steering knuckle increases the rigidity of the assembly. This rigid mounting and support of the steering arm enables it to act as an anchor for the brake band and without detracting from its efficiency as a steering arm. Furthermore, the same bosses to which the forks or branches 29$^a$, 29$^b$ of the steering arm are connected serve as supports for the brake band supporting arm 39; and the manner of connecting the forks or branches of this arm with these lugs enables them to serve as washers for the threaded ends of the arms 29$^a$, 29$^b$. The brake supporting and operating means can be applied to standard front, or steering, wheels, with no substantial change in the brake operating mechanism usualy employed, and with no material increase in cost thereovver.

In Figs. 5 and 6 there is shown a form of my invention wherein the steering arm is substantially identical with that shown in Figs. 3 and 4, while the brake operating cylinder is mounted on such arm in a manner similar to that shown in Figs. 1 and 2.

In these views, 2$^a$ denotes the forked ends of the front or steering wheel axle 2, 3 the king pin, and 4 the steering knuckle, the said knuckle having the bosses 30$^a$ and 30$^b$ to which are fitted the tapered ends 45$^b$ and 45$^c$ of the arm 45 and the diagonal brace 45$^a$ of the steering arm, the arm being secured firmly to said lugs by means of the nuts 46. The arm 45 is continued beyond the junction of the brace 45$^a$ therewith and is provided with an eye 45$^d$ for the reception of the tie rod (not shown).

The diagonal brace 45$^a$ is provided with a lug 47 to which one end of the cylinder 48 is pivotally connected by means of the clevis 48$^a$ and the pin 49. The piston rod 50 is connected by a clevis 50ª and a pin 51 with the upper end of an arm 52, the lower end of which is rigidly connected to a shaft 53, which is mounted in the steering arm. This shaft has rigid therewith the arms 54, extending in opposite directions therefrom, one of said arms being connected by a strap 55 with the upper portion of the brake band 9, and the other arm being connected in like manner, by a strap 56, with the lower portion of the brake band.

With the parts arranged as described, when oil or other pressure fluid is supplied to the piston through the hose or pipe 57, the piston rod 50 is forced to the left, rocking the arms 54 in opposite directions and thereby simultaneously applying both the upper and the lower sections of the brake band to the drum.

The arrangement shown and described in connection with Figs. 5 and 6 is extremely simple and efficient and can be applied to existing constructions of steering knuckles and brake bands with but slight alterations and at a low cost.

In Figs. 7 and 8 there is shown a form of my invention which is similar to that shown in Figs. 3 and 4. The portion of the brake band 9 which is remote from the ends thereof is provided with a bracket 9ª having a slot 9ᵇ therein, by means of which and a pin 28, it is slidably supported from the steering arm 29ᶠ. This arm, as is the case in Figs. 3 and 4, is provided with a tapered end portion fitting within the boss 30ᵇ of the steering knuckle 4, and the diagonal brace 29ᵍ is provided with a similar tapered end fitting in the seat in the upper boss 30ª of such arm.

The brake-band supporting arm 39 is provided at its outer end with an opening for the passage of the adjusting bolt 58, the lower end of which is pivotally connected to the inturned arm 59ª of the brake-band lever by means of a clevis 58ª and a pin 60. The inner end of the arm 59 is pivoted between lugs 61ª on the lower brake band bracket 61, by means of a pin 62. The stud 58 is provided with the adjusting nuts 58ª below the arm 39 and extends through the upper brake band bracket 63, being provided with a nut 64, of the usual type, having an edge connection with the forks of said bracket. Between said bracket and the arm 39 a helical spring 69 is interposed.

The inner end of the arm 39 is branched, one branch 39ª constituting in effect an extension of the outer part of the arm and being provided with a downturned end 39ᵇ adapted to bear against lug 30ª and constitute a washer for the threaded end of the brace 29ª against which the nut 66 bears. The other branch 39ᵇ of said arms forms a diagonal brace for the parts 39, 39ª, and its lower end is turned down, as shown at 39ᵈ, to bear against the lug 30ᵇ and constitute a washer surrounding the threaded end of the tapered portion of the arm 29ᶠ. A nut 67 is applied to the threaded end of the arm 29ᶠ and serves to draw the tapered portion of such arm to its seat and to clamp the part 39ᵈ against the boss. The arm 29ᶠ is extended beyond the pin 28 and provided with an eye 29ʰ for the reception of one end of the tie rod.

The nut 66 is provided with a lug 66ª to which the lower end of the cylinder 68 is pivotally connected by means of a clevis 68ª and a pin 69. The cylinder is provided with a pipe or hose 70 communicating with the lower end thereof and supplying oil or other pressure fluid thereto. The piston rod 71 is connected by a clevis 71ª and a pin 72 with the upper arm 59 of the brake band angle lever.

With the parts constructed and arranged as described, when fluid is admitted to the lower end of the cylinder, the piston will be forced upwardly, rocking the angle lever about the pin 60 as a pivot and forcing the lower half of the brake band in contact with the drum. After this contact, further movement of the piston will cause the angle lever to pivot about the pin 62, pulling downwardly on the bracket 63 and seating the upper half of the brake. A further application of fluid pressure to the cylinder will merely seat both sections of the brake tighter.

By turning the brake band assembly upside down, the nut 66 may be used for the lower nut, and the piston can be supported in substantially the position shown in Figs. 3 and 4.

In Figs. 9, 10 and 10ª, there is shown a modification of my invention as applied to an internal or expanding brake, the brake in this particular instance being shown as comprising a pair of brake shoes, although it will be evident that an ordinary internal brake band can be used with the installation.

In these views, 2 denotes the front axle, 2ª the forks thereof, 3 the king pin and 4 the steering knuckle, the steering knuckle being provided with an elongated boss 4ª, the said boss having tapered apertures therethrough for the reception of the tapered end portions of the steering knuckle arm and of its diagonal brace. The arm proper is indicated at 45ᶠ, the diagonal brace being indicated at 45ᵍ, and the tapered ends being indicated at 45ᵇ and 45ᶜ, while the nuts which draw the tapered ends to their seats in the lug are indicated at 46. The eye for the tie rod is indicated at 45ᵏ.

Projecting inwardly into the drum from the diagonal brace 45ᵍ is an anchor pin 73 to which are pivoted the proximate ends of the brake shoes 74, in the manner shown in Fig. 10ª. Friction material 74ª is applied to the outer faces of the brake shoes, and said shoes are provided with brackets 74ᵇ at their ends opposite the pin 73, said brackets serving as means whereby the shoes may be moved outwardly to force the lining 74ᵃ against the drum, by the mechanism to be described.

75 denotes the base of a bracket having a horizontal arm 75ᵃ and a diagonal arm 75ᵇ, said arms being united at their outer ends to provide a support 75ᶜ for a rock shaft 76 having a rocker cam 77 thereon. The base of the bracket is secured to the lug 4ᵃ, preferably by receiving the threaded ends of the arm 45ᶠ and brace 45ᵍ, being secured in place by the nuts 46, the upper of said nuts being provided with a lug 46ᵃ to which the cylinder 78 is pivoted by means of a clevis 78ᵃ and a pin 79. The cylinder is provided with the supply pipe or hose 78ᵃ, and the piston rod 80 is connected by a clevis 80ᵃ and a pin 81 to an arm 82 rigid with the cam shaft 76. The brake shoes are normally held out of engagement with the brake drum by means of a spring 83 connected to the portions thereof adjacent to the anchor pin 73 and by a similar spring 84 connected to the portions of the brake shoes adjacent to the operating brackets or projections 74ᵇ. Where an expanding brake band is used in place of brake shoes, the central portion of the band will be supported by the anchor pin 73, and the spring 83 can be dispensed with.

With the parts constructed and arranged as described, it will be evident that, by admitting oil or other pressure fluid to the cylinder 78, the piston rod 80 will be moved to the right, rocking the upper end of the arm 82 to the right and rocking the cam 77, thereby to spread apart the adjacent ends of the brake shoes. Upon relieving the pressure, the springs 83 and 84 will restore the parts to their original and normal positions.

By the construction described, the steering arm, with its diagonal brace, serves to increase the rigidity of the steering arm and the firmness of the support therefor. The steering arm also serves as a means for anchoring the brake; and the steering knuckle is also enabled, through the bracket 75 and the nuts 46, 46ᵃ, to provide an efficient and firm support for the mechanism for operating the brake.

Figure 11:
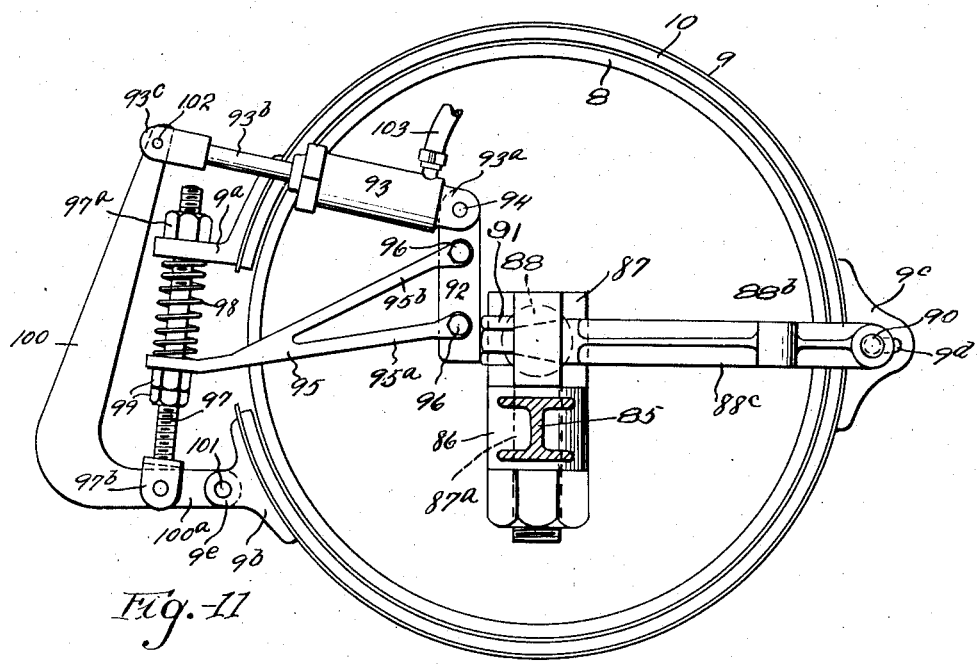
Figure 12:
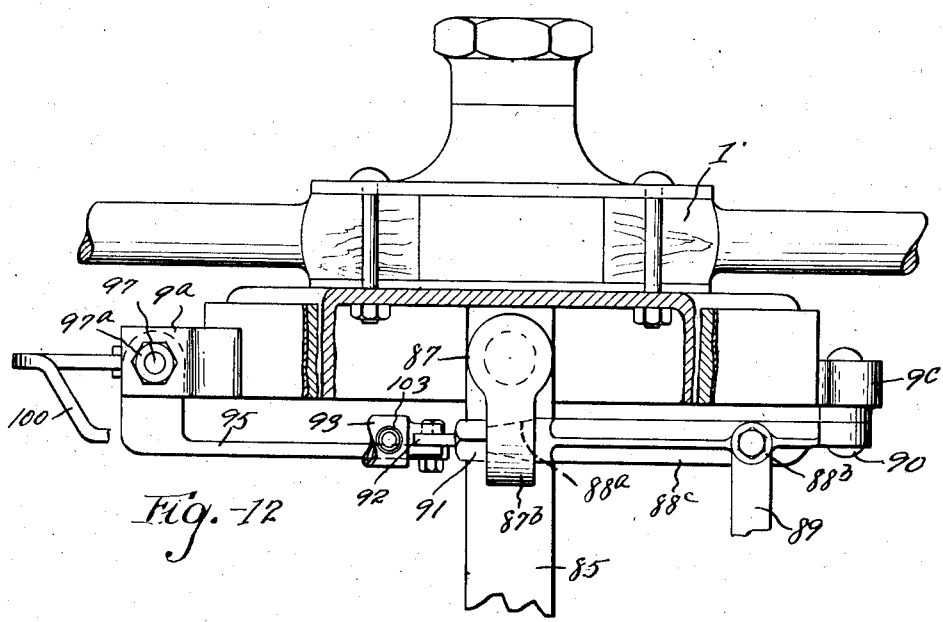

In Figs. 11 and 12 there is a further modification of my invention, said figures showing it applied to and in connection with a different type of steering knuckle than has been shown in the preceding views, it being noted, however, that in all forms of my invention disclosed herein the brake-operating mechanism is supported from the steering knuckle, directly or indirectly. The embodiment of my invention embodied in these views is similar to that shown in Figs. 7 and 8.

8 denotes the brake drum, 9 the surrounding brake band and 10 the brake lining, while 9ᵃ and 9ᵇ denote the upper and the lower brake band bracket, respectively.

The front, or steering, wheel axle 85 is of ordinary I-beam section, having a cylindrical head 86 at each end provided each with a vertical bore for the reception of a pin 87ᵃ carried by a head 87. This head carries the wheel spindle 88. In this case, the head 87 constitutes the steering knuckle, and is provided with a lug 87ᵇ having a tapered aperture for the reception of the tapered end 88ᵃ of the steering arm 88ᶜ. This arm is provided with an eye 88ᵇ for the reception of the tie rod 89 and supports the mid-portion of the brake band 9 by means of a bracket 9ᶜ on the latter and an anchor pin 90 carried by said arm and passing through a slot 9ᵈ in said bracket. The tapered end of the arm 88 is drawn to its seat by means of a nut 91. This nut is provided with an arm 92, formed therewith, which arm pivotally supports the cylinder 93, by means of the clevis 93ᵃ and the pivot pin 94.

95 denotes the brake-band supporting arm having the forks 95ᵃ and 95ᵇ connected to the arm 92, as by bolts 96. The outer end of the arm 95 extends between the brackets 9ᵃ and 9ᵇ and is provided with a perforation for the passage of the adjusting bolt 97, said bolt being provided with the usual adjusting nut 97ᵃ, with its upper end engaging the upper bracket 9ᵃ and with a spring 98 interposed between said bracket and the arm 95. Beneath the arm 95, the bolt is provided with the adjusting nuts 99 and its lower end is connected by a clevis 97ᵇ to the inwardly extending arm 100ᵃ of the angular brake band lever, the vertical arm of which is indicated at 100. The arm 100ᵃ is connected to the lower bracket 9ᵇ by means of a clevis 9ᵉ on said bracket and the pivot pin 101. The upper end of the arm 100 is connected to the piston rod 93ᵇ by means of a clevis 93ᶜ and a pin 102. Oil or similar pressure fluid is introduced into the cylinder 93 by means of a hose or pipe 103.

With the parts constructed and arranged as described, it will be evident that, when fluid under pressure is admitted to the cylinder 93, the piston rod 93ᵇ will be moved to the left, forcing upwardly the inner end of the lever arm 100ᵃ and applying the lower section of the brake; also that further movement of the arm 100 will result in pivoting the lever about the pin 101 and pulling downwardly upon the upper section of the brake band.

The construction last shown and described provides an efficient means for supporting the brake band from the steering arm and for carrying the brake-operating mechanism from the steering knuckle.

By the term "brake band" which will be used in the claims I do not propose to limit myself to a continuous band, as the same may be made discontinuous, or in sections as disclosed in Figs. 9, 10, and 10ᵃ.

Having thus described my invention, what I claim is:—

1. The combination, with a steering wheel axle, of a steering knuckle on said axle, a steering arm having a pair of branches, means securing said branches to said steering knuckle, a brake drum surrounding the said steering knuckle, a brake in operative relation to said drum, a cylinder pivotally supported from one of said branches, a piston rod extending from said cylinder, and connections for operating said brake by said piston rod.

2. The combination, with a steering wheel axle, of a steering knuckle, a steering arm connected with said steering knuckle, a brake drum, a brake cooperating with said drum, a cylinder pivotally supported from the said arm, and connections between said cylinder and the said brake for applying the brake to the said drum.

3. The combination, with a steering wheel axle, of a steering knuckle connected to said axle, a steering arm connected with the said knuckle, means for securing the steering arm to the said knuckle, a brake drum surrounding the steering knuckle, a brake in operative relation to said drum, a cylinder pivoted on such securing means, a piston rod extending from said cylinder, and an operative connection between said piston rod and said brake.

4. The combination, with a steering wheel axle, of a steering knuckle connected to said axle, a steering arm connected with the said knuckle, a nut for securing the steering arm to the said knuckle, the said nut having a projection, a brake drum surrounding the steering knuckle, a brake in operative relation to said drum, a cylinder pivoted on the said projection, a piston rod extending from said cylinder, and an operative connection between said piston rod and said brake.

5. The combination, with a steering wheel axle, of a steering knuckle on said axle, a steering knuckle arm, means including a nut for securing the said arm to the said knuckle, an arm having a foot secured to the steering knuckle by said nut, a brake drum surrounding the said steering knuckle, a brake band in operative relation to said drum, an adjusting bolt connected with opposite ends of the brake band and extending through the second arm, a cylinder pivoted to said nut, a piston rod extending from said cylinder, an arm connected with one end of the brake band and with said piston rod, and means pivotally connecting the adjusting bolt and the said arm.

6. The combination, with a steering wheel axle, of a steering knuckle connected to said axle, a brake drum surrounding said knuckle, a brake band in operative relation to said drum, a branched steering arm, means including a pair of lugs on the knuckle for securing the ends of the branches of said arm thereto, nuts cooperating with the ends of said branches to secure the same to said lugs, a forked arm having its feet or base portions interposed between the said nuts and the said lugs and secured to the said lugs by said nuts, one of said nuts having a projection, a cylinder pivoted to said projection, a piston rod extending from said cylinder, an angular lever connected at one end to said rod and at its opposite end to one of the ends of the brake band, and an adjusting bolt pivoted to the said lever and extending through the outer end of the second mentioned arm and connected to the other end of the brake band.

7. The combination, with a steering wheel axle, of a steering knuckle connected to said axle, a brake drum surrounding said knuckle, a brake in operative relation to said drum, a branched steering arm, means including a pair of lugs on the knuckle for securing the ends of the branches of said arm thereto, a cylinder pivotally supported from one of the branches of said arm, a piston extending from said cylinder, and connections for operating said brake from said rod.

In testimony whereof, I hereunto affix my signature.

ALVIN S. FISHEL.